United States Patent
Cao et al.

(10) Patent No.: US 10,083,266 B2
(45) Date of Patent: Sep. 25, 2018

(54) SIMULATION METHOD OF CMP PROCESS

(71) Applicant: SHANGHAI HUALI MICROELECTRONICS CORPORATION, Shanghai (CN)

(72) Inventors: Yun Cao, Shanghai (CN); Huan Kan, Shanghai (CN); Fang Wei, Shanghai (CN); Jun Zhu, Shanghai (CN); Yukun Lv, Shanghai (CN); Xusheng Zhang, Shanghai (CN)

(73) Assignee: SHANGHAI HUALI MICROELECTRONICS CORPORATION, Shanghai (CN)

( * ) Notice: Subject to any disclaimer, the term of this patent is extended or adjusted under 35 U.S.C. 154(b) by 84 days.

(21) Appl. No.: 15/283,286

(22) Filed: Sep. 30, 2016

(65) Prior Publication Data
US 2018/0032648 A1    Feb. 1, 2018

(30) Foreign Application Priority Data
Jul. 28, 2016    (CN) .......................... 2016 1 0606958

(51) Int. Cl.
*G06F 17/50* (2006.01)
*H01L 21/768* (2006.01)

(52) U.S. Cl.
CPC ...... *G06F 17/504* (2013.01); *H01L 21/76819* (2013.01); *G06F 2217/16* (2013.01)

(58) Field of Classification Search
CPC ............... G06F 17/504; G06F 2217/16; H01L 21/76819
See application file for complete search history.

(56) References Cited

U.S. PATENT DOCUMENTS

| | | | | |
|---|---|---|---|---|
| 6,883,153 B2* | 4/2005 | Jiang | ..................... | B24B 37/042 257/E21.583 |
| 7,146,593 B2* | 12/2006 | Travis | ................. | G06F 17/5068 716/122 |
| 7,153,728 B2* | 12/2006 | Morita | .............. | H01L 21/31053 438/129 |
| 7,197,726 B2* | 3/2007 | Ciplickas | ................ | H01L 22/34 257/48 |
| 7,360,179 B2* | 4/2008 | Smith | ................. | G06F 17/5068 257/E21.525 |

(Continued)

*Primary Examiner* — Naum B Levin
(74) *Attorney, Agent, or Firm* — Tianchen LLC

(57) ABSTRACT

A simulation method of CMP process comprises: building a CMP model, and forming a matrix table of line width logarithm-density according to the CMP model, and making each intersection of the matrix table correspond to each CMP result under the corresponding line width and density; dividing a layout into a plurality of grids, and converting the equivalent line width and density of each grid into the coordinate of line width logarithm-density in the matrix table; fitting and calculating preliminary CMP simulation results of each grid according to the coordinate of each grid in the matrix table and the CMP simulation results of its adjacent intersections of the matrix table; fitting and computing final CMP simulation results of each grid according to a related weighting factor which considers the impact of adjacent grids for the current grid on the layout; outputting the final CMP simulation results of the whole layout.

14 Claims, 4 Drawing Sheets

(56) References Cited

U.S. PATENT DOCUMENTS

| | | | |
|---|---|---|---|
| 8,122,392 B2* | 2/2012 | White | G06F 17/5068 |
| | | | 716/112 |
| 2017/0109646 A1* | 4/2017 | David | G03F 7/705 |
| 2017/0293711 A1* | 10/2017 | Liu | G06F 17/11 |

* cited by examiner

# SIMULATION METHOD OF CMP PROCESS

CROSS-REFERENCE TO RELATED APPLICATION

This application claims the priority benefit of China patent application serial No. 201610606958.4, filed Jul. 28, 2016, the entire contents of which are incorporated herein by reference.

FIELD OF THE INVENTION

The present invention relates to the field of electronic design automation technology in the integrated circuit manufacturing, and particularly to a simulation method of chemical mechanical polishing process.

BACKGROUND OF THE INVENTION

With the continues upgrading of technology nodes and improvement of lithography resolutions in the integrated circuit manufacturing process, the size of the analyzable minimum line width of the lithography process is gradually decreasing, then the depth of focus is also rapidly reducing, therefore, lithography process windows are also becoming smaller and smaller.

However, the number of layers in the production design is increasing. Especially for the metal dielectric layers, the surface planarization of the metal dielectric layers can greatly impact the depth of focus and the stress distribution of interconnection structures, etc., which are required in the lithography process. For the integrated circuits with several layers, the surface non-planarization will seriously affect the size of the lithography process windows.

In order to ensure the validity of the lithography process windows, the surface of productions must satisfy the specific need for the planarization. In current, the chemical mechanical polishing (CMP) process is usually used to ensure the surface of the metal dielectric layers to reach the aim of planarization in the integrated circuit manufacturing process.

However, due to the variations of polishing agent selection ratios, polishing table pressures, surface patterns of products, and so on, the absolute planarization of the chip surface cannot be reached after the CMP process, replaced by the topology wrinkles, which are usually described by the dielectric dishing and the dielectric corrosion. Wherein, the dielectric dishing refers to a thickness difference between two different dielectric layers at the patterned regions, while the dielectric corrosion refers to a thickness difference between the patterned regions and the unpatterned regions.

The dielectric dishing and the dielectric corrosion are accompanied problems by the CMP process, the oversize of the dielectric dishing and the dielectric corrosion will affect the size of the lithography process windows, especially for the single exposure shot. At the same time, the resistance and the capacitance properties of the interconnected lines are also affected, thereby the delay of the interconnected lines is impacted, and further the yield and performance of chips are influenced.

In order to improve the yield of the chips and reduce production costs, the surface patterns of products would be predicted in advance after the CMP process.

The CMP simulation method of the prior art, which predicted the surface patterns of products by building a model based on the manufacturing processes, firstly collected the data from all process steps in the order of production steps to debug out the corresponding process models, and then extracted the geometry features of the surface patterns to calculate out its final prediction results. However, there are also some disadvantages listed as follows:
1) Cumbersome steps;
2) Large amount of data collected;
3) Large computation of model prediction;
4) Large period of production prediction.

The disadvantages would lead to too long period of results output during the model prediction, so that it is adverse to shorten the production period of products.

BRIEF SUMMARY OF THE DISCLOSURE

To overcome the problems as mentioned above, it is an object of the present invention to provide a simulation method of CMP process to promote simulation speed and shorten the production period of products.

To achieve above object, the technical solutions of the present invention are as follows:

A simulation method of CMP process, comprising the steps of:

Step S01: building a CMP model, and forming a matrix table of line width logarithm-density according to the CMP model, and making each intersection of the matrix table correspond to each CMP result under the corresponding line width and density;

Step S02: dividing a layout into a plurality of grids, and converting the equivalent line width and density of each grid into coordinate of line width logarithm-density in the matrix table;

Step S03: fitting and calculating preliminary CMP simulation results of each grid according to the coordinate of each grid in the matrix table and the CMP simulation results of its adjacent intersections of the matrix table;

Step S04: fitting and calculating final CMP simulation results of each grid according to a related weighting factor, which considers the impact of adjacent grids for the current grid on the layout;

Step S05: outputting the final CMP simulation results of the whole layout.

Preferably, the Step S01 comprises the steps of:

Step S011: designing the matrix table of line width logarithm-density in which the range and the coordinate sequence step of the line width logarithm and the density are properly designed respectively according to the design rules of the specific process platform;

Step S012: designing a series of test patterns according to the line widths and the densities corresponded by intersections of the matrix table;

Step S013: collecting data of the CMP results of each test pattern, and directly assigning them to the corresponding intersections of the matrix table;

Step S014: calculating and assigning the CMP results for the remaining blank intersections of the matrix table basing on linear interpolation;

Step S015: saving the matrix table of which all intersections have been assigned, and formatting the CMP model of the corresponding process platform to the standard matrix table of line width logarithm-density in turn, and finally completing the building of all models.

Preferably, the range of the line width logarithm L is get by taking logarithm of the line width LW in the Step S011, which is calculated by the equation (1) that:

$$L = \{Log_A{}^{LW}\}_2 \qquad (1)$$

wherein, the unit of LW is micron, and its range is decided by the design rules where technology node is belonged to, the base number A of the logarithm is decided by the specific process platform, and $\{\ \}_2$ represents taking two valid digits after decimal point;

the value of the density is in the range from 0 to 1, the choice of the coordinate sequence step is decided by the accuracy and modeling efficiency of the CMP model.

Preferably, the number of the test patterns is not less than the half of the total number of the intersections of the matrix table in the Step S012.

Preferably, calculating and assigning the CMP results for the remaining blank intersections of the matrix table in the Step S014, which comprises the steps of:

Step S0141: checking the matrix table of line width logarithm-density, and determining the positions of the intersections which assignments are blank, wherein for the intersection $G_{i,j}$ of the matrix table which locates any non-edge position in the matrix table, if there are at least four intersections have been assigned among its adjacent intersections e. g., $G_{i-1,j-1}$, $G_{i,j-1}$, $G_{i+1,j-1}$, $G_{i+1,j}$, $G_{i+1,j+1}$, $G_{i,j+1}$, $G_{i-1,j+1}$, $G_{i-1,j}$, $G_{i,j}$ should be calculated and assigned by the equation (2) that:

$$G_{i,j}=w_1*(G_{i-1,j}+G_{i+1,j})+w_2*(G_{i,j-1}+G_{i,j+1})+w_3*(G_{i-1,j+1}+G_{i-1,j-1}+G_{i+1,j-1}+G_{i+1,j+1}) \quad (2)$$

wherein, i and j are coordinate serial numbers corresponding to the line width logarithm and the density in the matrix table respectively, unassigned intersections of the matrix table are defined by zero, $w_1 \sim w_3$ are received by fitting the data of the CMP results of the collected test patterns;

Step S0142: carrying out the Step S0141 repeatedly, until the blank intersections of the matrix table positioned any non-edge point, are assigned;

Step S0143: checking the matrix table of line width logarithm-density again, and determining the positions of the intersections which assignments are blank, wherein for the intersection $G_{i,j}$ of the matrix table which locates any edge position in the matrix table, if there exist at least four successive assigned intersections of the matrix table along the axis direction of the density or the line width logarithm, $G_{i,j}$ should be calculated and assigned by the equation (3) or (4) that:

$$G_{i,j}=u_1*G_{i,j-1}+u_2*G_{i,j-2}+u_3*G_{i,j-3}+u_4*G_{i,j-4} \quad (3)$$

$$G_{i,j}=v_1*G_{i-1,j}+v_2*G_{i-2,j}+v_3*G_{i-3,j}+v_4*G_{i-4,j} \quad (4)$$

wherein, i and j are coordinate serial numbers corresponding to the line width logarithm and the density in the matrix table respectively, $G_{i,j-1}$, $G_{i,j-2}$, $G_{i,j-3}$, $G_{i,j-4}$, $G_{i-1,j}$, $G_{i-2,j}$, $G_{i-3,j}$, $G_{i-4,j}$ represent the assigned intersections of the matrix table respectively, $u_1 \sim u_4$ and $v_1 \sim v_4$ are received by fitting the data of the CMP results of the collected test patterns respectively.

Preferably, when $G_{i,j}$ is calculated and assigned in the Step S0143, the equation (3) is firstly adopted to repeatedly carry out the Step S0143 along the axis direction of the density so that there no longer exist the unassigned intersections of the matrix table along the axis direction of the density; and then the equation (4) is adopted to repeatedly carry out the Step S0143 along the axis direction of the line width logarithm so that there no longer exist the unassigned intersections of the matrix table along the direction of the line width logarithm.

Preferably, the preliminary CMP simulation results of each grid are expressed by that of the corresponding coordinates G, which should be calculated by the equation (5) that:

$$G = \frac{1}{4}((1-n+m)*G_{i,j+1} + (m+n)*G_{i,j} + (1-m+n)*G_{i+1,j} + (2-m-n)*G_{i+1,j+1}) \quad (5)$$

wherein, i and j are serial numbers of the coordinates corresponding to the line width logarithm and the density in the matrix table respectively, m and n represent the relative position in the single lattice of the matrix table located by the grid's coordinates, and are ranged from 0 to 1 respectively, $G_{i,j+1}$, $G_{i+1,j}$, $G_{i+1,j}$, $G_{i+1,j+1}$ represent the corresponding CMP results of four intersections of the matrix table respectively which are adjacent with the grid's coordinate.

Preferably, the final CMP simulation result G' of each grid is calculated by the equation (6) that:

$$G' = \frac{K_0*G_0 + K_1*G_1 + K_2*G_2 + \ldots + K_n*G_N}{\sum_{p=0}^{n} K_p} \quad (6)$$

wherein, $K_p$ is the weighting factor, and ranged from 0 to 1, $G_0 \sim G_N$ represent the average values of the preliminary CMP simulation results of 0~N adjacent grids spacing the current grid respectively.

Preferably, the weighting factor $K_p$ is a distance related function between the current grid and its adjacent grids, and the value of $K_p$ becomes smaller and smaller with the increasing of the distance between the current grid and its adjacent grids.

Preferably, the CMP results comprise dielectric thickness and/or dielectric relative height.

Concluded from the above technical solutions, the invention has built the CMP model formed by a matrix table of line width logarithm-density corresponding to the CMP simulation results, the related information of the pattern is substituted into the matrix table to calculate the CMP simulation results, further the simulation results are amended by setting a related weighting factor which considers the impact of adjacent grids for the current grid, so that the simulation speed of the CMP process is significantly enhanced, a process design hot of the CMP process is checked out in time, and the production period of products is been shortening, on the base of ensuring the accuracy of the predicted results for the product simulation.

DETAILED DESCRIPTION OF THE EMBODIMENTS

Figure 1:
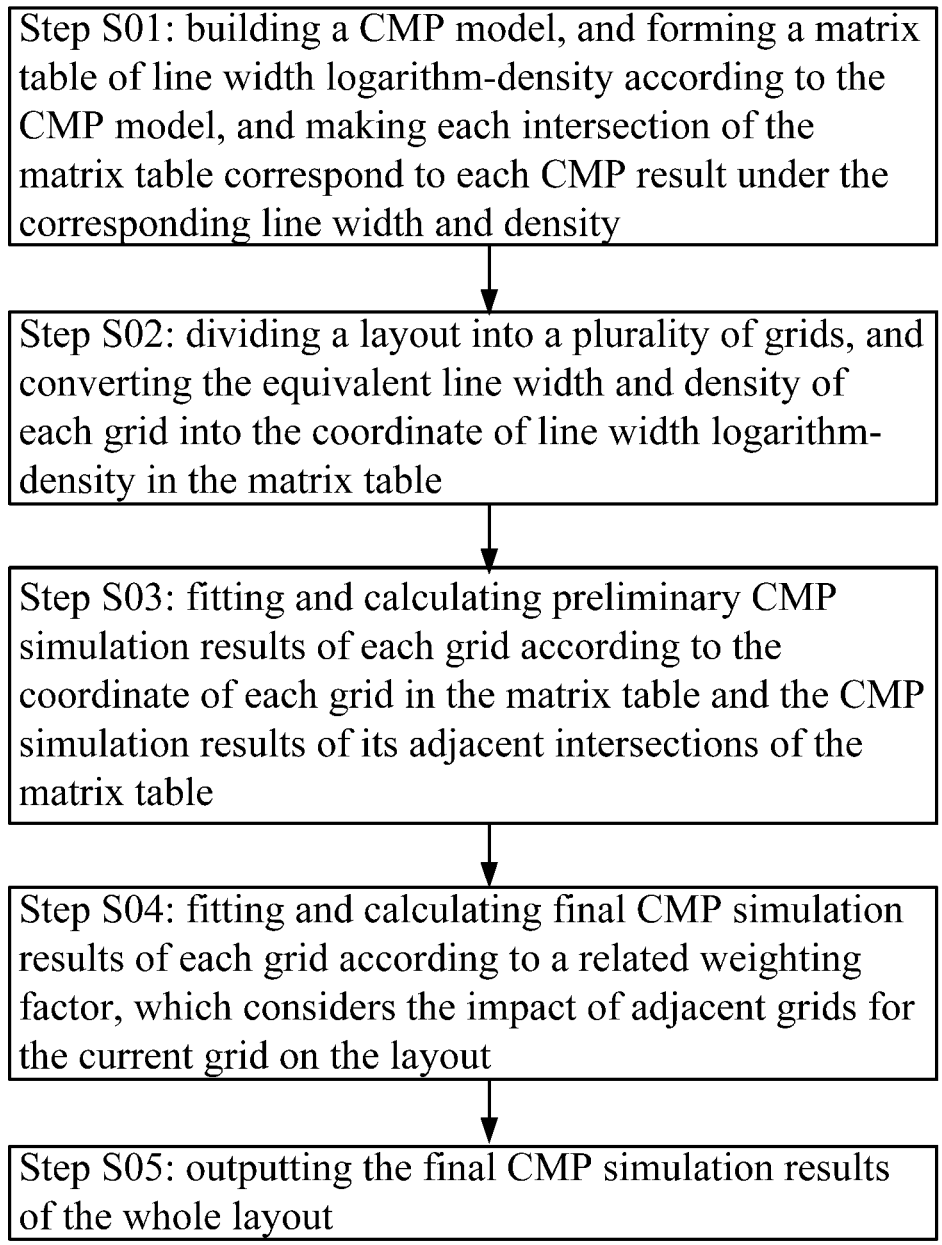
FIG. 1 is a flow sheet illustrating a simulation method of CMP process of the present invention.

The present invention will be described in further details hereinafter by referring to the accompanying drawings, so as to provide a better understanding of the present invention.

It should be noted that, in the following specific embodiments, when these embodiments of the present invention are described in detail, in order to clearly illustrate the structure of the present invention to facilitate explanation, the accompanying drawings are not necessarily drawn to scale, some features in the drawings may have been fragmentary enlarged, deformed or simplified. Therefore, it should be avoided to understand this as a limitation to the present invention.

In the design for the integrated circuit manufacturing process, the prediction for the surface patterns of products after the CMP process is an important step. Finding out the process design hots of the patterns rapidly and accurately can provide more support for the research and development of products, and save more time.

In order to achieve the above object, the present invention will be described in further details hereinafter by referring to the accompanying drawings.

Referring to FIG. 1, which is a flow sheet illustrating a simulation method of CMP process of the present invention. The method comprises the steps of:

Executing Step S01: building a CMP model, and forming a matrix table of line width logarithm-density according to the CMP model, and making each intersection of the matrix table correspond to each CMP result under the corresponding line width and density.

Building the CMP model mentioned above comprises the steps of:

Step S011: designing the matrix table of line width logarithm-density in which the range and the coordinate sequence step of the line width logarithm and the density are properly designed respectively according to the design rules of the specific process platform.

Figure 2:
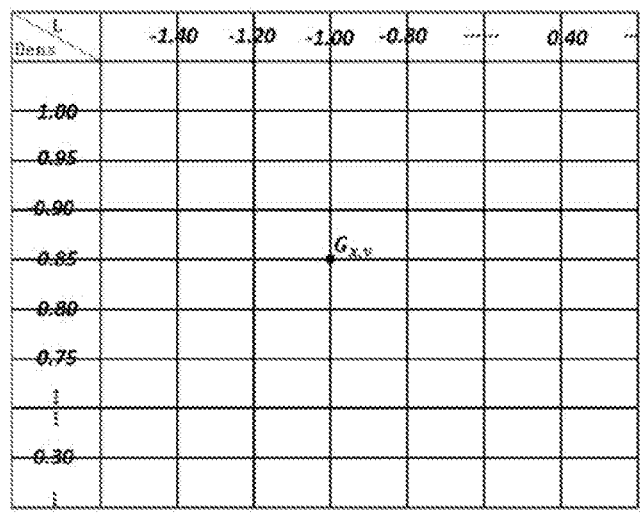
FIG. 2 is a schematic view illustrating a matrix table of line width logarithm-density according to a preferred embodiment of the present invention.

Firstly, according to the design rules of the specific process platform, designing a matrix table of line width logarithm-density shown in the FIG. 2, wherein the range of the line width logarithm L positioned in the X-axis direction (horizontal ordinate) is get by taking logarithm of the line width, which is calculated by the equation (1) that:

$$L=\{LogA^{LW}\}_2 \quad (1)$$

wherein, LW is the line width (the equivalent line width), the unit of LW is micron, and the range of LW is decided by the design rules where technology node is belonged to; the choice for the coordinate sequence step of the line width logarithm L needs to consider the requirements for the accuracy and modeling efficiency of the model concurrently. In other words, the higher the accuracy is, the lower the modeling efficiency is, and the smaller the coordinate sequence step of the line width logarithm L is. In this embodiment, the coordinate sequence step of the line width logarithm L is valued by 0.2; $\{\ \}_2$ represents taking two valid digits after decimal point; the base number A of the logarithm is valued by 10, which is decided by the specific process platform.

The density (Dens) along the Y-axis direction (vertical ordinate) of the matrix table is ranged from 0 to 1, the choice for the coordinate sequence step of the density also needs to consider the requirements for the accuracy and modeling efficiency of the model concurrently. In other words, the higher the accuracy is, the lower the modeling efficiency is, and the smaller the coordinate sequence step of the density is. In the embodiment, the coordinate sequence step of the density is valued by 0.05.

The intersection $G_{x,y}$ (coordinate) of the X-axis and the Y-axis in the matrix table shown in the FIG. 2 represents the CMP result corresponding to the related line width (or line width logarithm)-density. Wherein, x represents the coordinate sequence corresponding to the line width logarithm, and y represents the coordinate sequence corresponding to the density, the CMP results indicate some data such as the dielectric thickness, the relative height of the dielectric, and so on.

Step S012: designing a series of test patterns according to the line widths and the densities corresponded by intersections of the matrix table.

Specially, a series of the test patterns are designed according to the line widths and the densities corresponded by each intersection $G_{x,y}$ of the matrix table. In order to enhance the accuracy of the model, the number of the test patterns selected by design is not less than the half of the total number of the intersections of the matrix table.

Step S013: collecting the data of the CMP results of each test pattern, and directly assigning them to the corresponding intersections of the matrix table.

When the test patterns are applied to the CMP process, the related data of each the test pattern after the CMP process, e.g., the dielectric thickness, the dielectric dishing, and the dielectric corrosion, etc., are collected, then assigned to the intersection $G_{x,y}$ of the matrix table corresponding to the related line width logarithm-density.

In this embodiment, the data of all the test patterns such as the thickness of copper and the height of oxide after the CMP process is collected, then assigned to the intersections $G_{x,y}$ of the matrix table corresponded by the test patterns, which can be expressed by the formula of $G_{x,y}\{Cu\_thk:1000\ Å;OX\_hgt:950\ Å\}$.

Step S014: calculating and assigning the CMP results for the remaining blank intersections of the matrix table basing on linear interpolation.

Wherein, the Step S014 comprises the steps of:

Step S0141: checking the matrix table of line width logarithm-density, and determining the positions of the intersections which assignments are blank, which would be further calculated and assigned basing on linear interpolation.

Figure 3A:
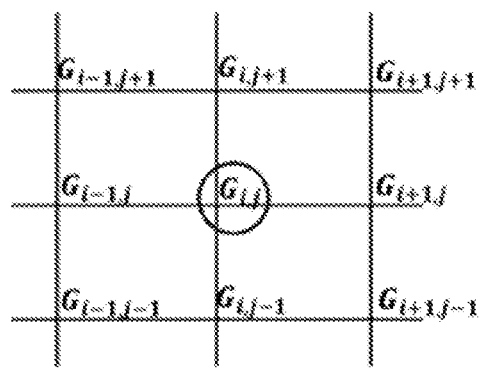
FIGS. 3a~3c are schematic views illustrating three kinds of the intersections assigned by nothing in the matrix table of line width logarithm-density.
Figure 3B:
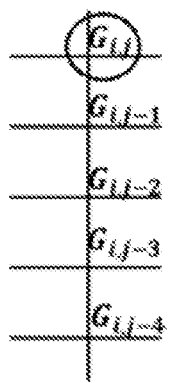
Figure 3C:
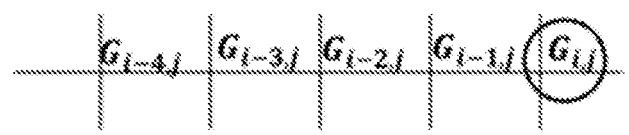

FIGS. 3a~3c are schematic views illustrating three kinds of the intersections assigned by nothing in the matrix table of line width logarithm-density.

For example, shown in the FIG. 3a, one kind of the intersections assigned by nothing $G_{i,j}$ are disposed, which locate at any non-edge position in the matrix table, and there are eight adjacent intersections around, which are $G_{i-1,j-1}$, $G_{i,j-1}$, $G_{i+1,j-1}$, $G_{i+1,j}$, $G_{i+1,j+1}$, $G_{i,j+1}$, $G_{i-1,j+1}$, $G_{i-1,j}$, if there are at least four out of eight intersections have been assigned, $G_{i,j}$ can be calculated and assigned by the equation (2) that:

$$G_{i,j}=w_1*(G_{i-1,j}+G_{i+1,j})+w_2*(G_{i,j-1}+G_{i,j+1})+w_3*(G_{i-1,j+1}+G_{i-1,j-1}+G_{i+1,j-1}+G_{i+1,j+1}) \quad (2)$$

wherein, i and j are the coordinate serial numbers corresponding to the line width logarithm and the density in the matrix table respectively, the values of the unassigned intersections are zero, $w_1$~$w_3$ are received by fitting the CMP results of the collected test patterns.

Step S0142: carrying out the Step S0141 repeatedly, until the blank intersections of the matrix table positioned at any non-edge point, are all assigned.

Step S0143: checking the matrix table of line width logarithm-density again, shown in the FIG. 3a, the second kind of the unassigned intersections $G_{i,j}$ are disposed, which locates at any edge position along the Y-axis direction in the matrix table; if there are four successive assigned intersections or more along the Y-axis direction (the density), $G_{i,j}$ can be calculated and assigned by the equation (3) that:

$$G_{i,j}=u_1*G_{i,j-1}+u_2*G_{i,j-2}+u_3*G_{i,j-3}+u_4*G_{i,j-4} \qquad (3)$$

Similarly, shown in the FIG. 3c, the third kind of the unassigned intersections $G_{i,j}$ are disposed, which locates at any edge position along the Y-axis direction in the matrix table; if there are four successive assigned intersections or more along the X-axis direction (the line width logarithm), $G_{i,j}$ can be calculated and assigned by the equation (4) that:

$$G_{i,j}=v_1*G_{i-1,j}+v_2*G_{i-2,j}+v_3*G_{i-3,j}+v_4*G_{i-4,j} \qquad (4)$$

In the equations (3) and (4), i and j are coordinate serial numbers corresponding to the line width logarithm and the density in the matrix table respectively, $G_{i,j-1}$, $G_{i,j-2}$, $G_{i,j-3}$, $G_{i,j-4}$, $G_{i-1,j}$, $G_{i-2,j}$, $G_{i-3,j}$, $G_{i-4,j}$ represent the assigned intersections of the matrix table respectively, $u_1$~$u_4$ and $v_1$~$v_4$ are received by fitting the CMP results of the collected test patterns respectively.

During the calculating of the Step S0143, the equation (3) is firstly adopted repeatedly until there no longer exist the second kind of the unassigned intersections along the density direction; similarly, then the equation (4) is adopted repeatedly until there no longer exist the third kind of the unassigned intersections along the line width logarithm direction.

Step S015: saving the matrix table of which all intersections have been assigned, and formatting the CMP model of the corresponding process platform to the standard matrix table of line width logarithm-density in turn, and finally completing the building of all models. Each intersection of the matrix table indicates the model data (the CMP results) correspond to the relative line width and density.

Executing Step S02: dividing a layout into a plurality of grids, and converting the equivalent line width and density of each grid into the coordinate of line width logarithm-density in the matrix table.

The forms of the divided grids comprise but not limited to a square or a round, and their size can also be changed according to the requirements.

Figure 5:
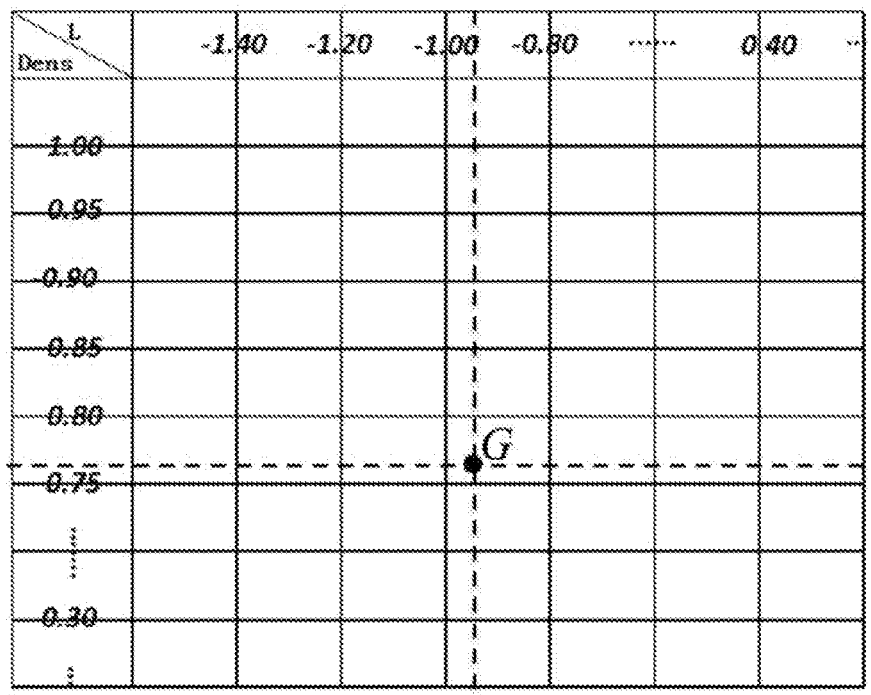
FIG. 5 is a schematic view illustrating the position of a grid in the matrix table of line width logarithm-density corresponding to the preliminary CMP simulation result.

The equivalent line width of each grid is received by a calculation, which is equal to the line width of products in the CMP model. According to the equation (1), the equivalent line width is translated to the line width logarithm in the matrix table of line width logarithm-density. Once the line width logarithm and the density are known, the coordinate G of the grid in the matrix table can be confirmed, shown in the FIG. 5.

Executing Step S03: fitting and computing preliminary CMP simulation results of each grid according to the coordinate of each grid in the matrix table and the CMP simulation results of its adjacent intersections of the matrix table.

According to the coordinate of the grid to be calculated in the normalized matrix table and the CMP simulation results of its adjacent intersections, the normalized matrix table of line width logarithm-density is applied to have a calculation, wherein the preliminary CMP simulation results of each grid are expressed by that of the corresponding coordinate G, which is calculated by the equation (5) that:

$$G = \frac{1}{4}((1-n+m)*G_{i,j+1} + (m+n)*G_{i,j} + \\ (1-m+n)*G_{i+1,j} + (2-m-n)*G_{i+1,j+1}) \qquad (5)$$

wherein, i and j are coordinate serial numbers corresponding to the line width logarithm and the density in the matrix table respectively, m and n represent the relative position in the single lattice of the matrix table located by the grid, and are ranged from 0 to 1 respectively, $G_{i,j+1}$, $G_{i+1,j}$, $G_{i+1,j}$, $G_{i+1,j+1}$ represent the corresponding CMP results of four intersections of the matrix table which are adjacent with the grid.

Figure 4:
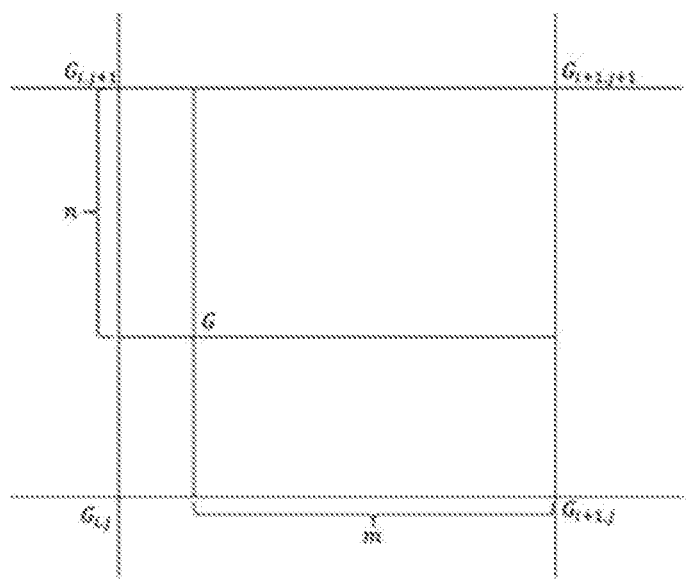
FIG. 4 is a schematic view illustrating the relative position of a grid in the corresponded lattice in the matrix table of line width logarithm-density.

Shown in the FIG. 4, the relative positions m,n in the single lattice of the matrix table located by the grid coordinate G are firstly calculated out. Wherein m is the ratio of the difference of the line width logarithm between the grid coordinate G to be calculated and the intersection $G_{i+1,j}$ of the matrix table to the corresponding line width logarithm step in the matrix table, and n is the ratio of the difference of the density between the grid coordinate G to be calculated and the intersection $G_{i,j+1}$ of the matrix table to the corresponding density step in the matrix table; the values of m and n are between 0 and 1 respectively. In this embodiment, if the equivalent line width of a grid is 0.07 µm and its density is 0.76, the preliminary CMP simulation result of the grid is equivalent to the data of the grid coordinate G in the matrix table shown in the FIG. 5, wherein m equals to ¾ and n equals to ⅘. The above values of m and n, the CMP simulation results of each intersection of the matrix table are substituted into the equation (5), so the preliminary CMP simulation results of the grid coordinate G can be obtained, namely, the preliminary CMP simulation results of the grid corresponded by the coordinate G.

Executing Step S04: fitting and computing final CMP simulation results of each grid according to a related weighting factor, which considers the impact of adjacent grids for the current grid on the layout.

Figure 6:
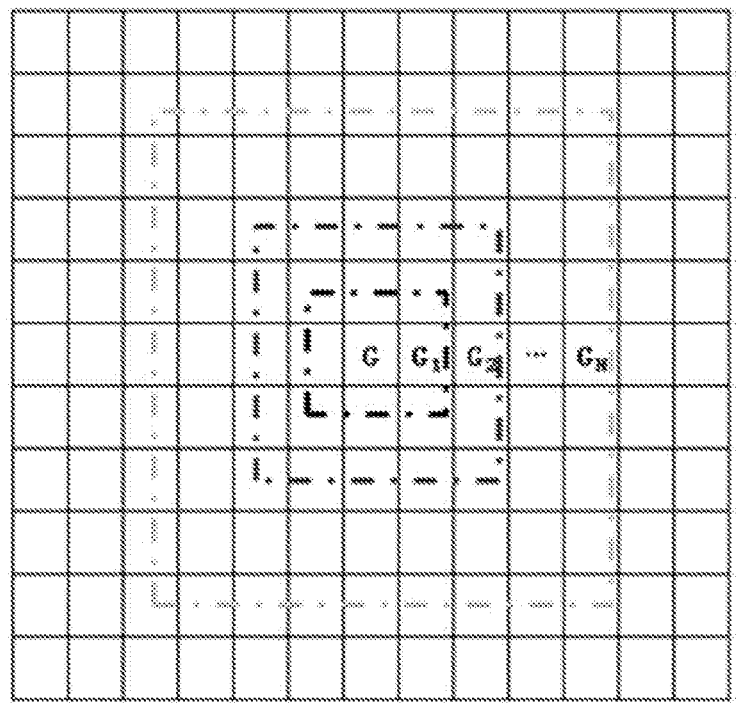
FIG. 6 is a schematic view illustrating the relative position of the current grid corresponding to its adjacent grids.

The distance S of impacting the current grid, distant from N grids, is determined according to the planarization and long-rang effect of the CMP. Therefore, the final CMP simulation results of the current grid can be calculated by the equation (6) that:

$$G' = \frac{K_0*G_0 + K_1*G_1 + K_2*G_2 + \ldots + K_N*G_N}{\sum_{p=0}^{n} K_p} \qquad (6)$$

wherein, $K_p$ is the weighting factor, which is a distance-related function between the current grid and its adjacent grids; the rang of $K_p$ is between 0 and 1. The farther the distance between the current grid and its adjacent grids is, the smaller the value of $K_p$ is $G_0$~$G_N$ represent the average values of the preliminary CMP results of 0~N adjacent grids spacing the current grid respectively, namely, $G_0$, $G_1$, $G_2$, ..., $G_N$ are the average values of the preliminary CMP simulation results of 0,1,2, ..., N adjacent grids spacing the current grid respectively, which are obtained by the equation (5), shown in the FIG. 6.

Executing Step S05: outputting the final CMP simulation results of the whole layout.

Finally, outputting the final CMP simulation results of the whole layout to receive the surface pattern of the layout after the CMP process. Wherein, the outputting forms of the final CMP simulation results of the whole layout can be displayed in the form of the prediction effect picture of the surface pattern comprising all the grids, or in the form of the prediction effect picture of the surface pattern of each grid (that is the prediction effect picture of a single point).

In summary, the invention has built the CMP model formed by a matrix table of line width logarithm-density corresponding to the CMP results, in which the related information of the pattern are firstly substituted to calculate out the preliminary CMP simulation results, further amending that by a related weighting factor which considers the impact of adjacent grids for the current grid, and finally the final CMP simulation results are received. Therefore, the simulation speed of the CMP process is significantly enhanced, the design hots are checked out in time, and the production period of products is greatly shortened, on the base of ensuring the accuracy of the simulation results for the product prediction.

Although the present invention has been disclosed as above with respect to the preferred embodiments, they should not be construed as limitations to the present invention. Various modifications and variations can be made by the ordinary skilled in the art without departing the spirit and scope of the present invention. Therefore, the protection scope of the present invention should be defined by the appended claims.

The invention claimed is:

1. A simulation method of CMP process, comprising the steps of:

Step S01: building a CMP model, and forming a matrix table of line width logarithm-density according to the CMP model, and making each intersection of the matrix table correspond to each CMP result which is obtained after performing a CMP process under the corresponding line width and density;

Step S02: dividing a layout into a plurality of grids, and converting the equivalent line width and density of each grid into the coordinate of line width logarithm-density in the matrix table;

Step S03: fitting and calculating preliminary CMP simulation results of each grid according to the coordinate of each grid in the matrix table and the CMP simulation results of its adjacent intersections of the matrix table;

Step S04: fitting and calculating final CMP simulation results of each grid according to a related weighting factor, which considers the impact of adjacent grids for the current grid on the layout;

Step S05: outputting the final CMP simulation results of the whole layout.

2. The simulation method according to claim 1, wherein the Step SO1 comprises the steps of:

Step S011: designing the matrix table of line width logarithm-density in which the range and the coordinate sequence step of the line width logarithm and the density are properly designed respectively according to the design rules of the specific process platform;

Step S012: designing a series of test patterns according to the line widths and the densities corresponded by intersections of the matrix table;

Step S013: collecting data of the CMP results of each test pattern, and directly assigning them to the corresponding intersections of the matrix table;

Step S014: calculating and assigning the CMP results for the remaining blank intersections of the matrix table basing on linear interpolation;

Step S015: saving the matrix table of which all intersections have been assigned, and formatting the CMP model of the corresponding process platform to the standard matrix table of line width logarithm-density in turn, and finally completing the building of all models.

3. The simulation method according to claim 2, wherein the range of the line width logarithm L is get by taking logarithm of the line width LW in the Step S011, which is calculated by the equation (1) that:

$$L=\{Log A^{LW}\}_2 \quad (1)$$

wherein, the unit of LW is micron, and its range is decided by the design rules where technology node is belonged to; the base number A of the logarithm is decided by the specific process platform; $\{\ \}_2$ represents taking two valid digits after decimal point;

the value of the density is in the range from 0 to 1, the choice of the coordinate sequence step is decided by the accuracy and modeling efficiency of the CMP model.

4. The simulation method according to claim 2, wherein the number of the test pattern is not less than the half of the total number of the intersections of the matrix table in the Step S012.

5. The simulation method according to claim 2, wherein calculating and assigning the CMP results for the remaining blank intersections of the matrix table in the Step S014, which comprises the steps of:

Step S0141: checking the matrix table of line width logarithm-density, and determining the positions of the intersections which assignments are blank, wherein for the intersection $G_{i,j}$ of the matrix table which locates any non-edge position in the matrix table, if there are at least four intersections have been assigned among its adjacent intersections e. g., $G_{i-1,j-1}$, $G_{i,j-1}$, $G_{i+1,j-1}$, $G_{i+1,j}$, $G_{i+1,j+1}$, $G_{i,j+1}$, $G_{i-1,j+1}$, $G_{i-1,j}$, $G_{i,j}$ should be calculated and assigned by the equation (2) that:

$$G_{i,j}=w_1*(G_{i-1,j}+G_{i+1,j})+w_2*(G_{i,j-1}+G_{i,j+1})+w_3*(G_{i-1,j+1}+G_{i-1,j-1}+G_{i+1,j-1}+G_{i+1,j+1}) \quad (2)$$

wherein, i and j are coordinate serial numbers corresponding to the line width logarithm and the density in the matrix table respectively, unassigned intersections of the matrix table are defined by zero, $w_1 \sim w_3$ are received by fitting the data of the CMP results of the collected test patterns;

Step S0142: carrying out the Step S0141 repeatedly, until the blank intersections of the matrix table positioned at any non-edge point, are all assigned;

Step S0143: checking the matrix table of line width logarithm-density again, and determining the positions of the intersections which assignments are blank, wherein for the intersection $G_{i,j}$ of the matrix table which locates any edge position in the matrix table, if there exist at least four successive assigned intersections of the matrix table along the axis direction of the density or the line width logarithm, $G_{i,j}$ should be calculated and assigned by the equation (3) or (4) that:

$$G_{i,j}=u_1*G_{i,j-1}+u_2*G_{i,j-2}+u_3*G_{i,j-3}+u_4*G_{i,j-4} \quad (3)$$

$$G_{i,j}=v_1*G_{i-1,j}+v_2*G_{i-2,j}+v_3*G_{i-3,j}+v_4*G_{i-4,j} \quad (4)$$

wherein, i and j are coordinate serial numbers corresponding to the line width logarithm and the density in the matrix table respectively, $G_{i,j-1}$, $G_{i,j-2}$, $G_{i,j-3}$, $G_{i,j-4}$, $G_{i-1,j}$, $G_{i-2,j}$, $G_{i-3,j}$, $G_{i-4,j}$ represent the assigned intersections of the matrix table respectively, $u_1$~$u_4$ and $v_1$~$v_4$ are received by fitting the data of the CMP results of the collected test patterns respectively.

6. The simulation method according to claim 5, wherein when $G_{i,j}$ is calculated and assigned in the Step S0143, the equation (3) is firstly adopted to repeatedly carry out the Step S0143 along the axis direction of the density so that there no longer exist the unassigned intersections of the matrix table along the axis direction of the density; and then the equation (4) is adopted to repeatedly carry out the Step S0143 along the axis direction of the line width logarithm so that there no longer exist the unassigned intersections of the matrix table along the direction of the line width logarithm.

7. The simulation method according to claim 5, wherein the CMP results comprise dielectric thickness and/or dielectric relative height.

8. The simulation method according to claim 2, wherein the CMP results comprise dielectric thickness and/or dielectric relative height.

9. The simulation method according to claim 1, wherein the preliminary CMP simulation results of each grid are expressed by that of the corresponding coordinates G, which should be calculated by the equation (5) that:

$$G = \frac{1}{4}((1-n+m)*G_{i,j+1} + (m+n)*G_{i,j} + (1-m+n)*G_{i+1,j} + (2-m-n)*G_{i+1,j+1}) \quad (5)$$

wherein, i and j are serial numbers of the coordinates corresponding to the line width logarithm and the density in the matrix table respectively, m and n represent the relative position in the single lattice of the matrix table located by the grid's coordinates, and are ranged from 0 to 1 respectively $G_{i,j+1}$, $G_{i+1,j}$, $G_{i+1,j}$, $G_{i+1,j+1}$ represent the corresponding CMP results of four intersections of the matrix table respectively which are adjacent with the grid's coordinate.

10. The simulation method according to claim 9, wherein the final CMP simulation result G' of each grid is calculated by the equation (6) that:

$$G' = \frac{K_0*G_0 + K_1*G_1 + K_2*G_2 + \ldots + K_n*G_N}{\sum_{p=0}^{n} K_p} \quad (6)$$

wherein, $K^p$ is the weighting factor, and ranged from 0 to 1, $G_0$~$G_N$ represent the average values of the preliminary CMP simulation results of 0~N adjacent grids spacing the current grid respectively.

11. The simulation method according to claim 10, wherein the weighting factor $K_p$ is a distance related function between the current grid and its adjacent grids, and the value of $K_p$ becomes smaller and smaller with the increasing of the distance between the current grid and its adjacent grids.

12. The simulation method according to claim 10, wherein the CMP results comprise dielectric thickness and/or dielectric relative height.

13. The simulation method according to claim 9, wherein the CMP results comprise dielectric thickness and/or dielectric relative height.

14. The simulation method according to claim 1, wherein the CMP results comprise dielectric thickness and/or dielectric relative height.

* * * * *